US012330210B2

(12) United States Patent
Vitello et al.

(10) Patent No.: US 12,330,210 B2
(45) Date of Patent: Jun. 17, 2025

(54) METHOD FOR PRODUCING FLEXIBLE TOOLING FOR CASTING A CERAMIC CORE

(71) Applicant: Siemens Energy Global GmbH & Co. KG, Munich (DE)

(72) Inventors: Travis John Vitello, Waxhaw, NC (US); Lara Richerson, Charlottesville, VA (US); Douglas Bibb, Staunton, VA (US); Scott Gangle, Barboursville, VA (US); Robert Bruce, Barboursville, VA (US); Ian T. Doran, Charlottesville, VA (US); Christopher Duren, Charlottesville, VA (US); Andrew Belling, Charlottesville, VA (US); Wayne J. McDonald, Charlotte, NC (US)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 515 days.

(21) Appl. No.: 17/772,873

(22) PCT Filed: Nov. 1, 2019

(86) PCT No.: PCT/US2019/059295
§ 371 (c)(1),
(2) Date: Apr. 28, 2022

(87) PCT Pub. No.: WO2021/086391
PCT Pub. Date: May 6, 2021

(65) Prior Publication Data
US 2022/0379368 A1    Dec. 1, 2022

(51) Int. Cl.
*B22C 9/10*        (2006.01)
*B22C 7/02*        (2006.01)
*B33Y 80/00*       (2015.01)

(52) U.S. Cl.
CPC .................. *B22C 9/10* (2013.01); *B22C 7/02* (2013.01); *B33Y 80/00* (2014.12)

(58) Field of Classification Search
CPC ...................................................... B22C 21/01
See application file for complete search history.

(56) References Cited

U.S. PATENT DOCUMENTS 11,806,894 B2 *  11/2023  Dodds ....................... B28B 7/34
2011/0132563 A1    6/2011  Merrill et al.
(Continued)

FOREIGN PATENT DOCUMENTS

CN    102753284 A    10/2012
CN    103722128 A    4/2014
(Continued)

OTHER PUBLICATIONS

PCT International Search Report and Written Opinion of International Searching Authority mailed May 12, 2020 corresponding to PCT International Application No. PCT/US2019/059295 filed Nov. 1, 2019.

*Primary Examiner* — Xiao S Zhao
*Assistant Examiner* — Nicholas J Chidiac
(74) *Attorney, Agent, or Firm* — Wolter Van Dyke Davis, PLLC

(57) ABSTRACT

A method for producing a flexible tooling liner for casting a ceramic core is presented. The method includes the steps of producing a three-dimensional (3D) reference object representative of a ceramic core to be cast, disposing the reference object into a containment vessel configured to receive a liquid flexible tooling material, filling the containment vessel with the liquid tooling material so that the reference object is encapsulated by the liquid tooling material on the surface whose topography is intended to be imparted, allowing the liquid tooling material to cure, and separating the (Continued)

cured flexible tooling along a parting surface into opposing portions and removing the reference the reference object.

18 Claims, 7 Drawing Sheets

(56) References Cited

U.S. PATENT DOCUMENTS

| | | |
|---|---|---|
| 2013/0333855 A1 | 12/2013 | Merrill et al. |
| 2015/0202683 A1* | 7/2015 | Bunker .................. B22D 25/02 164/23 |
| 2016/0346831 A1 | 12/2016 | Snyder et al. |
| 2020/0198180 A1* | 6/2020 | Dodds ..................... B28B 7/346 |
| 2022/0219226 A1* | 7/2022 | Rougier ................... B22C 9/22 |

FOREIGN PATENT DOCUMENTS

| | | |
|---|---|---|
| CN | 104959551 A | 10/2015 |
| DE | 2508276 A1 | 9/1976 |
| EP | 2719509 A2 | 4/2014 |
| EP | 3381582 A2 | 10/2018 |
| KR | 20110066767 A | 6/2011 |

* cited by examiner

METHOD FOR PRODUCING FLEXIBLE TOOLING FOR CASTING A CERAMIC CORE

BACKGROUND

1. Field

Aspects of the disclosure generally relate to investment casting processes. More specifically, a method for producing flexible tooling for casting a ceramic core used in investment casting is presented.

2. Description of the Related Art

Investment casting is a technique utilized for, among other things, producing accurate castings of specialized metal alloys formed around a wax pattern tool which is then removed. Currently, investment casting is commonly used to produce gas turbine components such as blades and vanes having complex airfoil shapes and internal cooling passage geometries. The production of an investment cast gas turbine blade or vane typically involves producing a ceramic casting mold having an outer ceramic shell with an inside surface corresponding to the airfoil shape and one or more ceramic cores positioned within the outer ceramic shell, corresponding to interior cooling passages to be formed within the airfoil. Molten alloy is introduced into the ceramic casting mold and is then allowed to cool and to harden. The outer ceramic shell and ceramic core(s) are then removed e.g. by chemical or mechanical means to reveal the cast blade or vane having the external airfoil shape and hollow interior cooling passages in the shape of the ceramic core(s).

In U.S. Pat. No. 9,272,324, Merrill et al. teaches a method to produce a plurality of flexible tooling liner useful for molding a ceramic core, and which is itself produced from a master tool machined from a soft metal. This approach is limited by the time required to machine a master tool for defining the geometry of the flexible tooling liner used to mold a ceramic core and the difficulty to alter the machined master tool profile in an expeditious manner. Consequently, a faster, less expensive method to produce the flexible tooling used to mold a ceramic core is desired.

SUMMARY

Briefly described, aspects of the present disclosure relate to a method for producing a flexible tooling liner for casting a ceramic core, a method of forming a ceramic core for an investment casting from a flexible tooling liner, and a method for producing a contoured flexible tooling liner for casting a ceramic core by controlling the thickness of the flexible tooling liner.

A first aspect of provides a method for producing a flexible tooling liner for casting a ceramic core. The method includes the steps of producing a three-dimensional (3D) reference object representative of a ceramic core to be cast, disposing the reference object into a containment vessel configured to receive a liquid flexible tooling material, filling the containment vessel with the liquid tooling material so that the reference object is encapsulated by the liquid tooling material on the surface whose topography is intended to be imparted, allowing the liquid tooling material to cure, and separating the cured flexible tooling along a parting line into two opposing halves and removing the reference the reference object.

A second aspect of provides a method of forming a ceramic core for an investment casting from a flexible tooling liner. The initial steps correspond to the steps of the method for producing a flexible tooling liner for casting a ceramic core as recited above. These steps are producing a three-dimensional (3D) reference object representative of a ceramic core to be cast, disposing the reference object into a containment vessel configured to receive a liquid flexible tooling material, filling the containment vessel with the liquid tooling material so that the reference object is encapsulated by the liquid tooling material on the surface whose topography is intended to be imparted, allowing the liquid tooling material to cure, and separating the cured flexible tooling along a parting line into two opposing halves and removing the reference the reference object. Then, the ceramic core is cast from the tooling liner. This is accomplished by preparing the flexible tooling liner to receive a ceramic material, casting the ceramic material in the flexible tooling liner to form the ceramic core, and removing the cured ceramic core from the flexible tooling liner.

A third aspect provides a method of producing a contoured flexible tooling liner for casting a ceramic core by controlling the thickness of the flexible tooling liner. The method includes the steps of producing a 3D reference object representative of a ceramic core to be cast, disposing the reference object into a containment vessel configured to receive a liquid flexible tooling material, producing a contoured tooling object configured to divide the cavity into an inner cavity and outer cavity, disposing the contoured tooling object into the containment vessel so that the cavity is divided into the inner cavity and the outer cavity, filling the inner/outer cavity with the liquid flexible tooling material, allowing the flexible tooling material to cure within the filled inner/outer cavity creating the inner/outer liner, removing the contoured tooling object from the containment vessel, filling the remaining cavity with the liquid flexible tooling material, allowing the liquid flexible tooling material to cure within the remaining cavity, removing the inner liner and the outer liner from the containment vessel, and separating the inner and outer liner and removing the reference object.

DETAILED DESCRIPTION

To facilitate an understanding of embodiments, principles, and features of the present disclosure, they are explained hereinafter with reference to implementation in illustrative embodiments. Embodiments of the present disclosure, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

In lieu of defining the topography of the flexible tooling liner by means of a machined master tool as known to those skilled in the art, methods to define said topography by a solidly constructed and otherwise contoured reference object representative of the molded ceramic core is hereby presented. While an airfoil is discussed throughout the disclosure as the object for an investment casting process, it is merely for exemplary purposes. One skilled in the art will recognize that the proposed method may be used to produce a flexible tooling liner utilized in an investment casting process for a variety of different objects as well.

Briefly, methods for producing a flexible tooling liner for casting a ceramic core are presented. From the flexible tooling liner, a ceramic core for an investment casting may be produced. For the purposes of this disclosure, the term 'flexible' as used herein, refers to a quick curable material such as a room temperature vulcanizing (RTV) silicone rubber or other material which may be used to form a 'flexible mold' which is not rigid like prior art metal molds, but that allows the mold to be bent and stretched to a degree in order to facilitate the removal of the mold from a structure cast therein.

Figure 1:
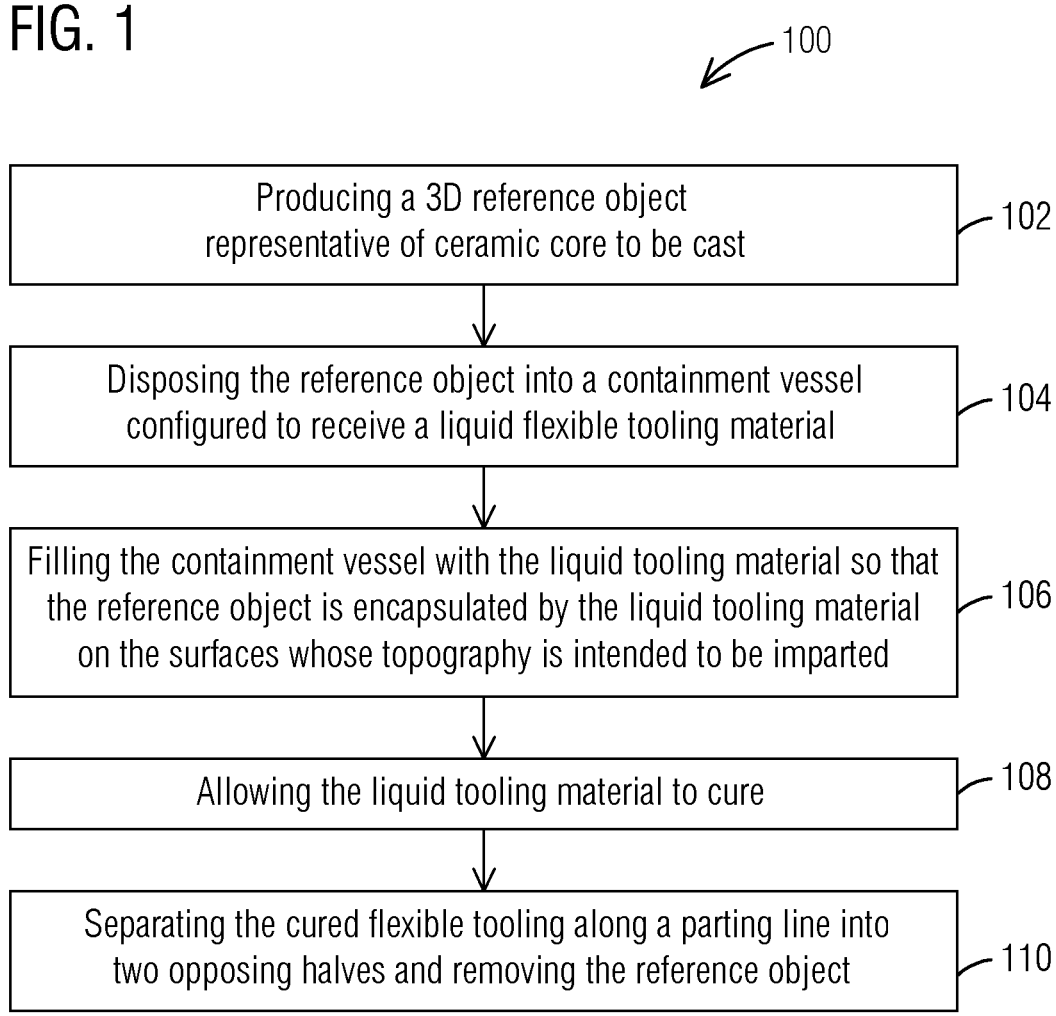
FIG. 1 illustrates a flow chart of one non-limiting embodiment of a method for producing a flexible tooling liner for casting a ceramic core.

Referring now to FIG. 1, a flow chart depicting a method 100 of producing a flexible tooling liner for casting a ceramic core is presented. In this illustrated representation, initially, a three-dimensional (3D) reference object representative of the ceramic core to be cast is produced 102. Additionally, a containment vessel is obtained for containing the reference object as well as a liquid flexible tooling liner material for producing the flexible tooling liner. The reference object is then disposed in and appropriately supported within the containment vessel 104. The containment vessel is then fully filled or partially filled 106 with the liquid flexible tooling liner material such that the reference object is encapsulated by the chemical compound on the surfaces whose topography is intended to be imparted into the flexible tooling liner formed upon the curing of the liquid flexible tooling liner material. The chemical compound is then allowed to cure 108, generally, by some thermodynamic and/or chemical process familiar to those skilled in the art. Upon curing, the now-solidified flexible tooling liner will resemble a shell about the reference object. The subsequent separation 110 of that solidified flexible tooling liner will have thus yielded a flexible liner capable of casting a ceramic core.

Figure 2:
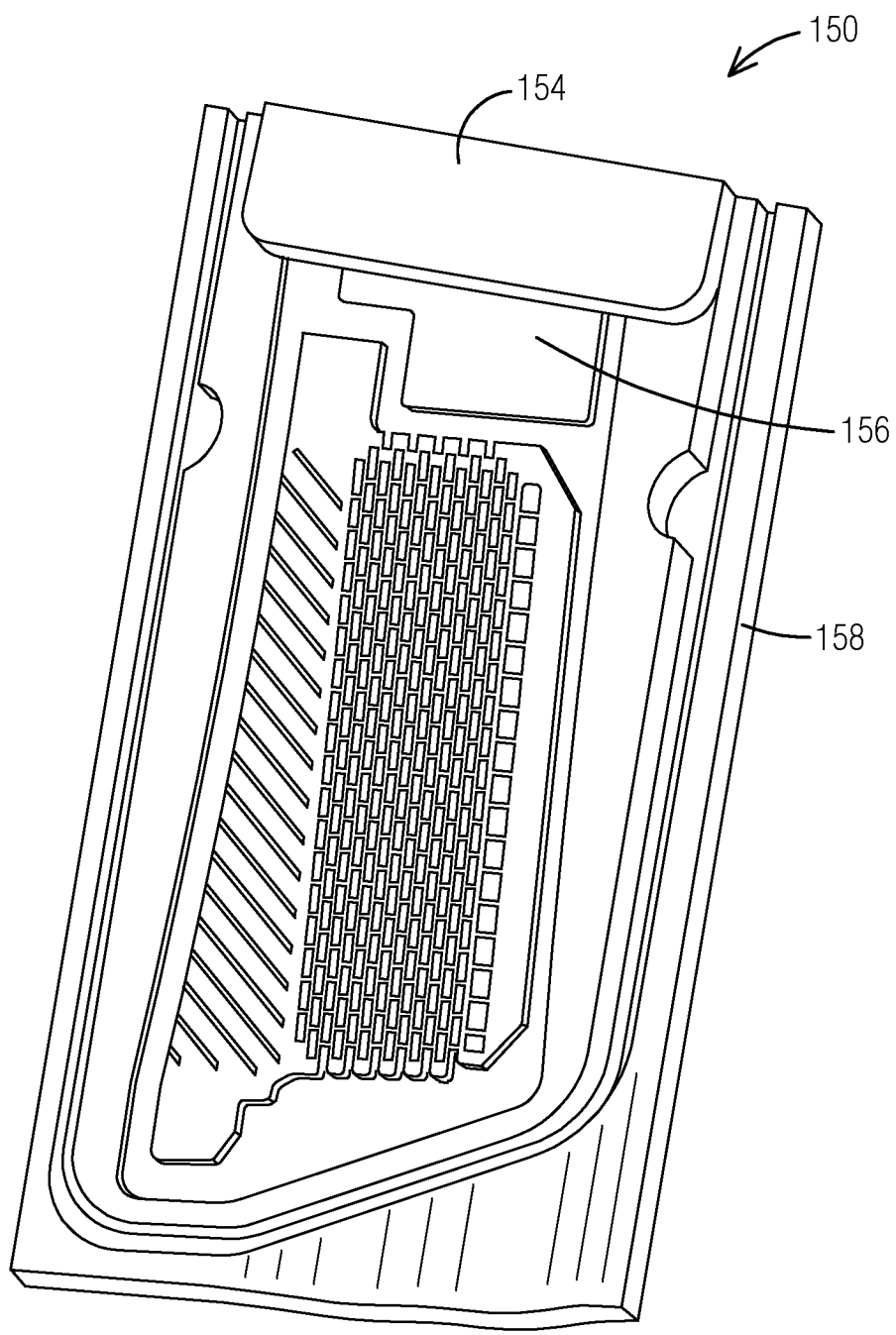
FIG. 2 illustrates a perspective view of a reference object template.

In an embodiment, the 3D reference object may be produced by an additive manufacturing process, a molding process, or by a machining process. However, other processes known to one skilled in the art may also be utilized to produce the 3D reference object. In an embodiment, the reference object may be a two-sided reference object. For example, a 3D reference object template 150 used for producing the flexible tooling liner for casting a turbine vane is shown in FIG. 2. Only one side is shown in the FIG. 2, however, the opposite side of the template 150 may include the corresponding opposite side geometry of the turbine vane to be cast.

Figure 3:
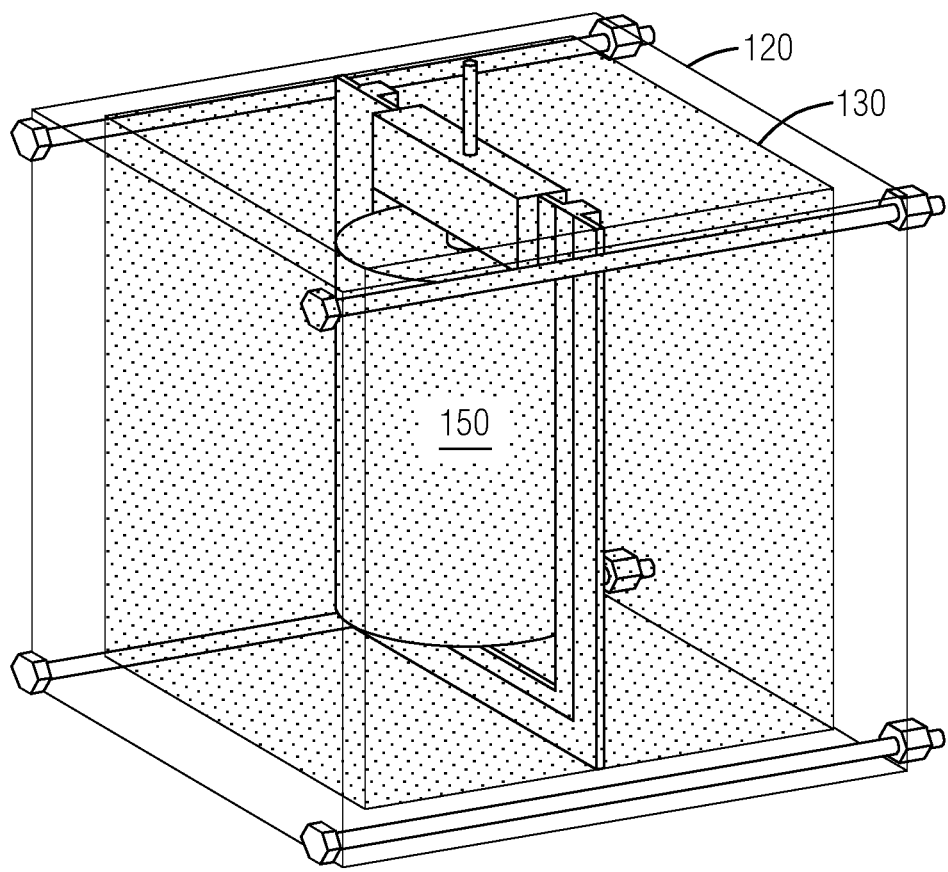
FIG. 3 illustrates a perspective view of a containment vessel containing a suspended reference object.

While other shaped containment vessels may be utilized in the presented method, for ease of use, a box shaped containment vessel is exemplified in the shown embodiments. For example, FIG. 3 illustrates a box-shaped containment vessel 120 containing a cylindrical reference object 150 suspended in the central part of its interior cavity. The containment vessel 120 is configured to receive a liquid flexible tooling liner material 130. The flexible tooling liner material 130 may be a quick curable chemical compound such as silicone rubber. By situating the reference object 150 in the containment vessel 120 through suspension or another suitable means, as shown, the containment vessel 120 may be filled with the flexible tooling liner material 130, in a fluid state that will conform to the surface topography of the reference object 150.

Figure 4:
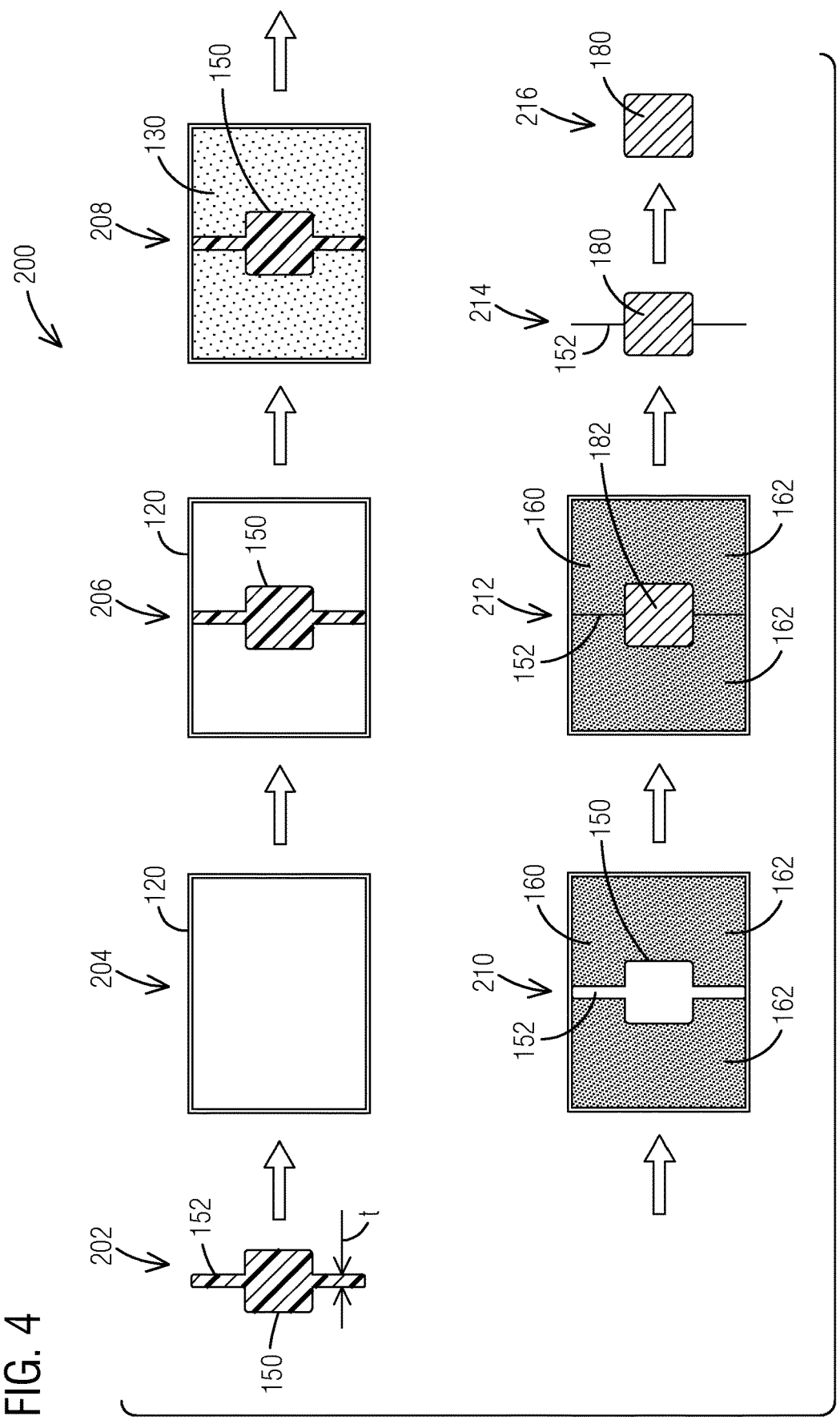
FIG. 4 illustrates a simplified pictorial view of an embodiment of the proposed method steps.

Once the flexible tooling liner material 130 has cured, separation of the two halves of the flexible tooling liner may be accomplished along a parting line, which may be defined as the surface about which portions of the flexible tooling liner are separated. The surface may be a plane or may be a contoured surface about which portions of the flexible tooling may be separated. For the exemplary purposes only, the parting line will be a surface plane about which two opposing halves will be separated. In an embodiment, the parting line includes a thickness, such that the parting line is extended. The parting line extension allows for any through features, such as holes, windows, or other openings not to be filled in by the liquid flexible tooling liner material 130 with the result that the two resultant halves are geometrically isolated as separately formed but are otherwise interfacing sections. Referring to FIG. 4, which shows a simplified pictorial representation of an overall investment casting process 200, the reference object 150 shown includes a parting line 152 having a thickness (t). The parting line thickness (t) from the reference object 150 will then be passed on to the flexible liner.

Figure 5:
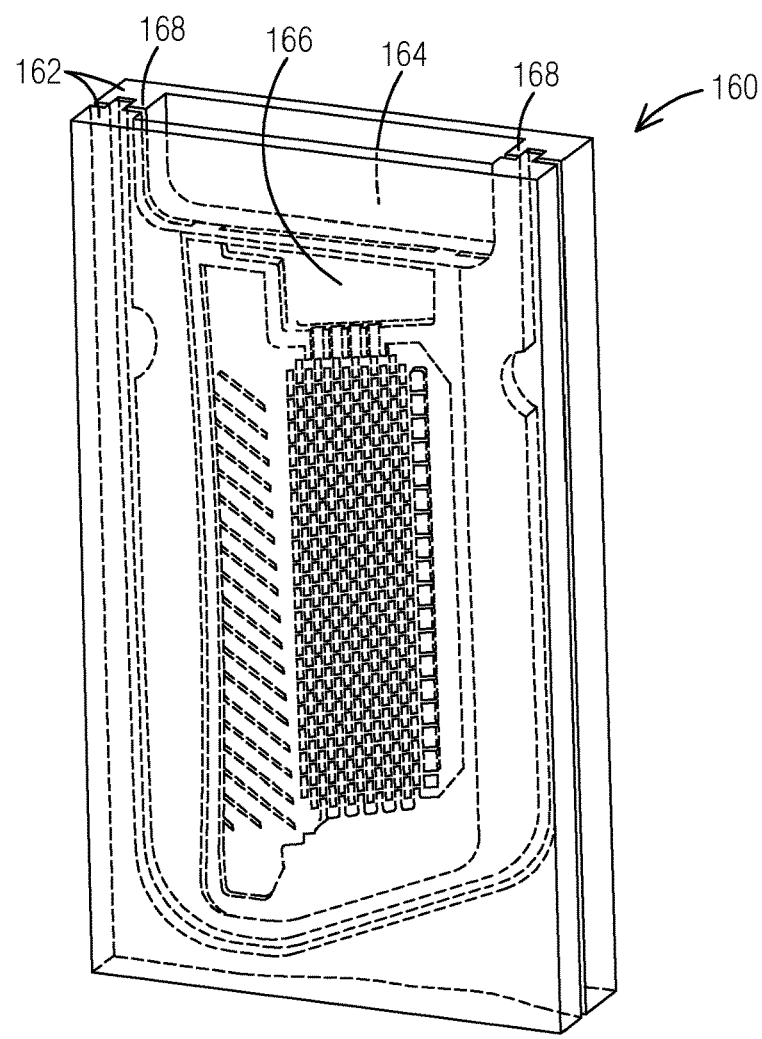
FIG. 5 illustrates a perspective view of a flexible tooling liner.

In an embodiment, when the reference object 150 includes a form of a suction side of a turbine vane on one side and a pressure side of the turbine vane on the other side, the parting line thickness (t), for example, may be in a range of 0.10-0.50 in. to provide strength and rigidity to the extended parting line surface without being excessively thick. FIG. 5 illustrates a flexible tooling liner 160 made from the reference object template 150 shown in FIG. 2. Upon removal of the reference object 150 from the cavity formed between the two flexible tooling liner halves 162, the parting line thickness (t) will be fully or partially eliminated as the two halves 162 are brought together to form a flush or nearly flush contact, thereby achieving the intended ceramic core geometry. The parting line 152 is effectively removed when the walls of the containment vessel 120 are brought together through the tightening of the associated clamping hardware or some other means, thereby bringing together the two liner halves 162 into contact. The temperature at which the flexible liner 160 is heated, and at which a slurry is cured upon being poured into the cavity formed between liner halves 162, also may affect the parting line thickness (t) as the liners will expand due to elevated temperature. Thus, the parting line 152 may be further removed or partially removed by temperature means through the heating of the liner halves 162 and/or through the curing process of the slurry. Including an extended parting line in the production of the flexible liner 160 allows both halves 162 of the flexible liner to be made off the same reference object 150 simultaneously.

In certain embodiments, a design feature is integrated into the reference object geometry to facilitate the flexible tooling liner production. For example, referring back to FIGS. 2 and 5, a font and feed channel may be incorporated into the reference object geometry. The reference object 150, shown in FIG. 2, includes a feature geometry in order to create the font 154 and a feed channel 156, the feed channel 156 extending from the font 156 through which a liquid material may flow when casting a ceramic core. The corresponding font 164 and feed channel 166 shown in the flexible tooling liner 160 of FIG. 5 may be utilized when casting the ceramic core so that the liquid ceramic slurry may be fed into the font 164 where it is temporarily held in order to control a feed rate through the feed channel 166 into the cavity of flexible tooling liner defining the geometry of the object to be cast.

In an embodiment, the design feature includes an alignment feature. The alignment feature may be disposed along the periphery of the reference object 150 to facilitate the alignment of the reference object and/or the support of the reference object 150 within the containment vessel 120. The alignment features may include, but are not limited to, an extended tab, stem, protrusions, embossments, or tongue and groove interface comprised of a male and corresponding female interface. For example, a tab feature 158 for supporting the reference object 150 within the containment vessel 120 may be see on the reference object 150 of FIG. 2. Another exemplary embodiment of an alignment feature may be seen in the flexible tooling liner 160 of FIG. 5 which includes a tongue and groove interface 168 in order to hold the two halves 162 of the flexible tooling liner 160 together.

Further, to overcome possible areas where non-conformal features are required in the solidly structured reference object, it may be desired to replace one or a plurality of sections of the template geometry with refined, lithographically derived inserts in a manner similar to that of WO 2017/160304, in which Merrill et al teaches of a method for modifying a tooling assembly that includes a backing plate with a plurality of lithographically derived inserts. These inserts may include a bottom surface, side surface, and a top surface whose geometry includes a finer resolution or otherwise higher definition than the adjacent geometry of the reference object. The insert may be installed in correspondingly shaped cavities within the reference object and may be interchanged with other inserts in order to create alternate topography on the reference object. The insert may also include a backing plate to partially occupy the volume of the cavity within the reference object, such that the insert may have minimal depth.

In an embodiment, the insert may comprise a similar or equivalent material as the reference object. Thus, it would possess similar or equivalent material properties, such as, for example, the coefficient of thermal expansion. Having two components, i.e., the reference object and the insert, with similar or equivalent material properties can prevent phenomena including thermally induced fatigue or geometric mismatches due to relative differences in rates of growth/shrinkage.

The lithographically derived insert may also include an alignment feature for proper integration, including positioning and securing within the solidly structured template geometry. One skilled in the art would recognize that other methods of aligning or securing the insert, such as adhesive bonding, locking, or press-fitting, to the reference object may also be used.

Referring back now to FIG. 4, a simplified pictorial representation 200 of the overall investment casting process is depicted. The flexible tooling liner 160, in a process as described above and shown in FIG. 1, is produced prior to casting the ceramic core. The steps in the flowchart of FIG. 1 partially correspond to pictorial steps 202-210 in FIG. 4. A reference object 150 may be produced 202 including a parting line 152 as shown. A containment vessel 120 is obtained 204 which may be a box shape as depicted. The reference object 150 is then placed 206 and supported within the containment vessel 120. In the shown embodiment, the parting line assists in supporting the reference 150 within the containment vessel 120. A flexible liquid tooling material 130 is poured 208 into the containment vessel 120 until it is filled or partially filled and the reference object 150 is encapsulated by the liquid tooling material 130 on the surfaces whose topography is intended to be imparted in the flexible tooling liner formed upon the curing of the liquid tooling material 130. After the liquid tooling material 130 is allowed to cure, the flexible tooling liner 160 is separated along the corresponding parting line 152 into two opposing halves 162 and the reference object 150 is removed 210. The cavity once occupied by the volume of the reference object 150 is thus bounded by the imparted geometry created by the solidification of the flexible liquid tooling 130 material about the reference object 150.

Figure 6:
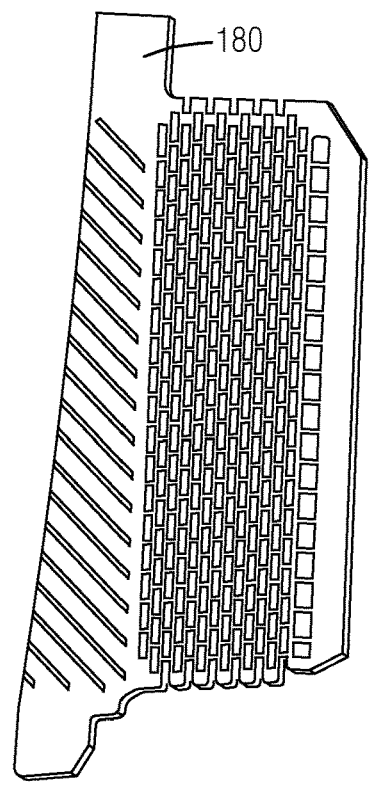
FIG. 6 illustrates a side view of a cast ceramic core produced from the flexible tooling liner of FIG. 5.

With the flexible tooling liner 160 now produced, a ceramic core may then be cast from the flexible tooling liner 160. The two separate opposing halves 162 of the flexible tooling liner 160 are aligned (with the parting line thickness mostly removed) thereby forming a cavity capable of receiving a ceramic slurry 182 such as a liquid mixture including silica dioxide and solvent or other mixture familiar to those of skill in the art. The flexible tooling liner 160 may be supported in an appropriate structure that may be the original containment vessel 120, but also may be another suitable structure that can support the flexible tooling liner 160 as well as the slurry 182. The slurry 182 may then be poured 212 into the cavity. The slurry 182 is allowed to cure generally by some thermodynamic and/or chemical process familiar to those skilled in the art. The flexible tooling liner halves 162 are then separated 214 along the parting line 152, thereby exposing the newly molded ceramic object 180, itself in a 'green' state. The 'green' ceramic object 180 may then be subject to industrial process known to those skilled in the art such as, for example, hand-detailing and kiln-firing and/or sintering. Any remaining parting line 152 excess may be removed. A ceramic core 180 is thus produced 216. As an example of a produced ceramic core, FIG. 6 illustrates a ceramic core 180 produced, according to the described method, from the flexible liner 160 shown in FIG. 5 depicting the geometry of a gas turbine vane.

In order to accommodate core geometries that are significantly contoured, such as a gas turbine blade which may include a significant curvature, it may be desired to control the thickness of the flexible tooling liner to avoid conditions where the liner thickness varies significantly. It is known that especially thick sections, for example a thickness greater than 0.03 in., of a tooling liner material will increase the moment of inertia and the corresponding thickness of the liner, thereby reducing its flexibility. With reduced flexibility, removing the ceramic core from the flexible liner may be difficult or impractical.

Shell blocks, known in the art, are typically utilized to control the thickness of flexible tooling liners. These shell blocks are machined, soft metal components that provide a backside contour for the flexible tooling liner. However, a shell block produced by alternate means such as 3D printing, may be utilized to control the thickness of the flexible tooling liners. Shell blocks that are machined metallic components have the disadvantage of being expensive to machine, heavy to handle, and possess a non-trivial difference in the coefficient of thermal expansion relative to that of the material of the flexible tooling liner which may include a silicone rubber polymer.

In an embodiment, in order to overcome the challenge of maintaining a controlled flexible tooling liner thickness for significantly contoured geometries, while overcoming the limitations intrinsic to metallic shell blocks, a method is disclosed that utilizes inner and outer flexible tooling liners, where the outer liner functions as a silicone rubber or other equivalent shell block in order to control the thickness of the inner flexible tooling liner. This will advantageously allow a transition from contoured liner geometries to a flat geometry such as that of the inner walls of a containment vessel, i.e., a flat-walled box described previously.

Figure 7:
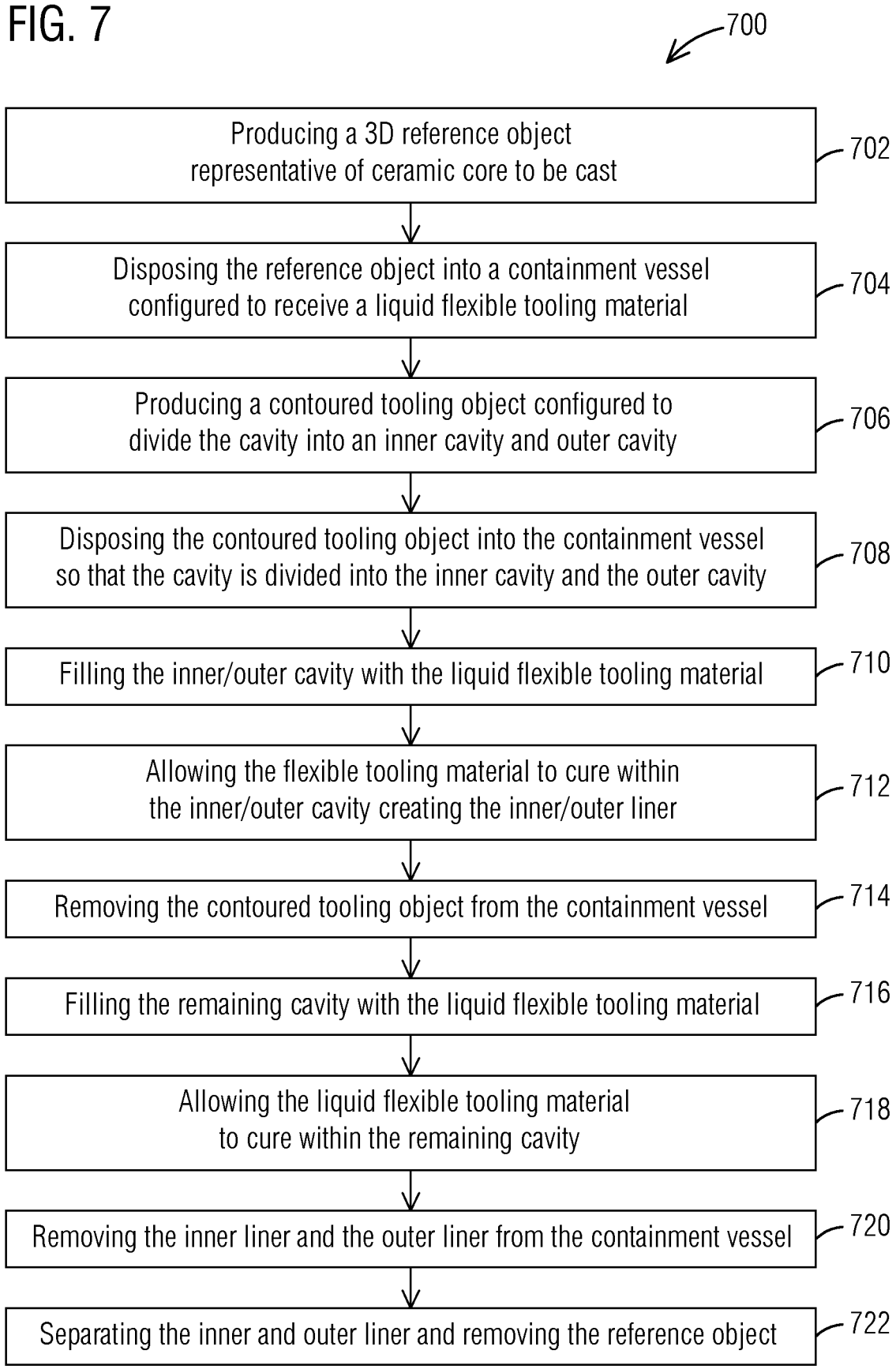
FIG. 7 illustrates a flow chart of one non-limiting embodiment of a method for producing a contoured flexible tooling liner for a casting.

Referring now to FIG. 7, a flow chart depicting a method 700 of producing a contoured flexible tooling liner for casting a ceramic core by controlling the thickness of the flexible tooling liner is presented. The first two 702, 704 steps of the method correspond to that of the method illustrated in FIG. 1 to produce a flexible tooling liner 160. A 3D reference object representative of the ceramic core to be cast is produced 702. This reference object 150 is then disposed 704 into a containment vessel 120 configured to receive a liquid flexible tooling liner material 130. Additionally, a contoured tooling object is produced 706 and configured to divide the cavity into an inner cavity and an outer cavity.

In an embodiment, the contoured tooling object is disposed 708 within the cavity formed within the containment vessel 120, once the reference object 150 is already disposed in the containment vessel, in order to divide the cavity into an inner cavity and an outer cavity. The contoured tooling object may be used to form the inward surface of the outer liner or to form the inward surface of the outer liner. Similarly, to steps performed in the methods described above, the inner/or outer cavity may be filled 710 with the liquid flexible tooling material 130. Either cavity, the inner or outer cavity, may be filled prior to the other, however, in certain embodiments the outer cavity may be filled first in order to adequately form a desired design feature. Accordingly, the filled inner/outer cavity is allowed to cure 712 creating a respective inner/outer liner. At this point the contoured tooling object is removed from the containment vessel 120. Next, the remaining cavity is filled 716 with the liquid tooling material 130 and allowed to cure 718 within the respective cavity. The inner and outer liners may then be removed 720 from the cavity and separated 722 from one another. The flexible tooling inner liner is separated 722 along the corresponding parting line 152 into two opposing halves 162 and the reference object 150 is removed 722.

Figure 8:
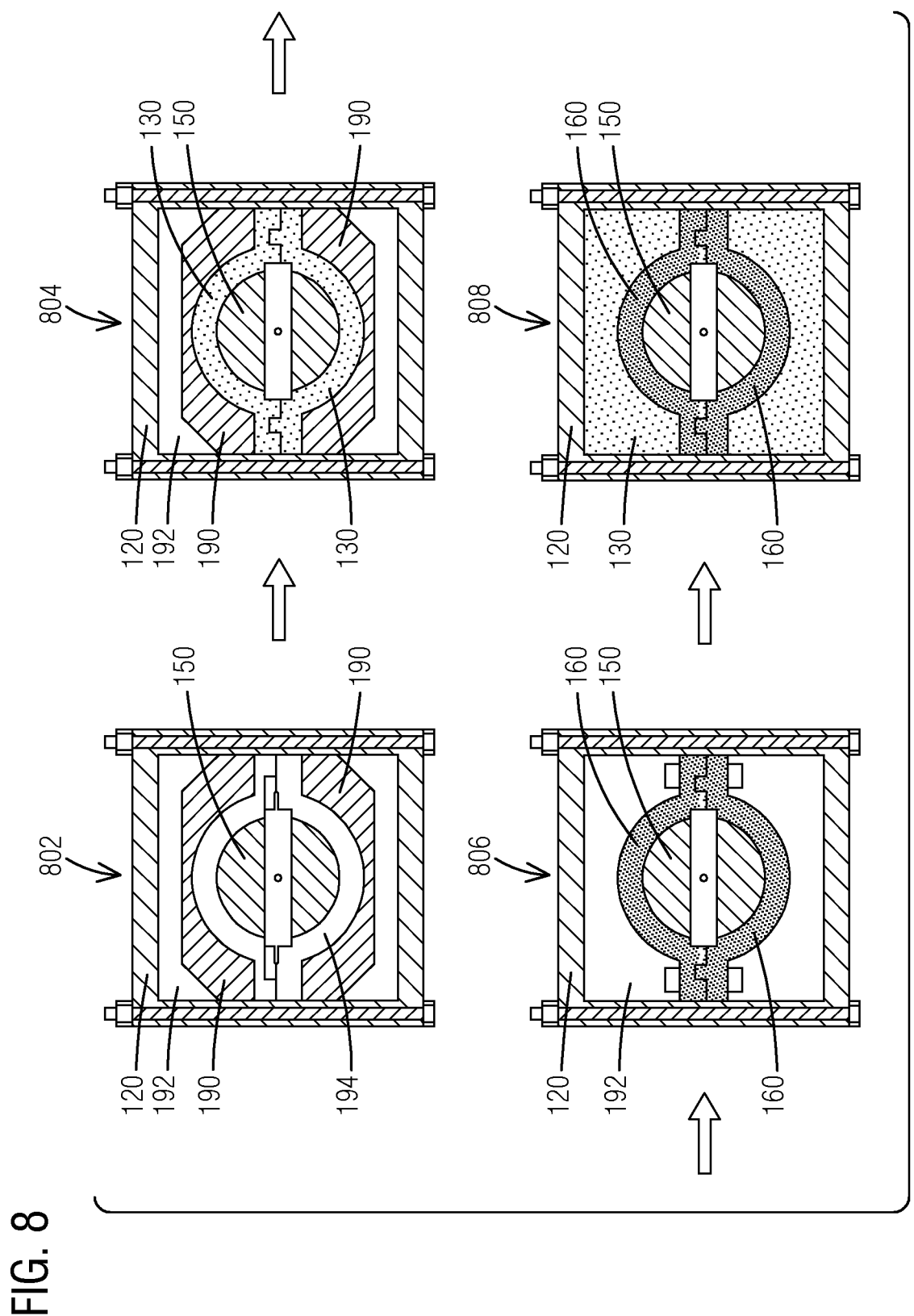
FIG. 8 illustrates a simplified pictorial view of an embodiment of the proposed method steps for producing a contoured flexible tooling liner.

FIG. 8 illustrates a simplified pictorial view of an embodiment of the process of utilizing a contoured tooling object to control the thickness of the flexible tooling liner for a contoured component. FIG. 8 is a cross sectional view of the containment vessel 120 containing a contoured reference object 150 as shown in FIG. 3. Step 802 illustrates a contoured tooling object 190 disposed within a cavity 192 defined by the reference object 150 and the containment vessel 120. The contoured tooling object 190 may be placed on both sides of the reference object 150 and disposed in a location within the cavity 192 to limit the thickness of an inner liner produced by pouring a flexible tooling material 130 within an inner cavity 194 defined by an inner surface of the contoured tooling object 190 and the reference object 150. In an embodiment, the desired thickness of the inner liner should be 0.10 to 0.40 in.

In step 804 a liquid flexible tooling liner material 130, such as silicone rubber, may be poured to fill or partially fill the inner cavity 194 on either or both sides, as shown, of the reference object 150. The liquid flexible tooling liner material 130 is then allowed to cure, generally, by some thermodynamic and/or chemical process familiar to those of skill in the art. The contoured tooling object 190 may then be removed 806 leaving the cured inner liner 160 and the cavity 192 formed by the outer surface of the inner liner and the inner surface of the containment vessel 120 as shown in 806. Lastly, in FIG. 8, the remaining cavity is filled 808 with the liquid flexible tooling material 130 and allowed to cure by some thermodynamic or chemical process familiar to those in the art, in order to form an outer liner.

In an embodiment, the outer surface of the cured inner liner or the inner surface of the cured outer liner, whichever is produced first, is prepared with a coating such as a coating of Teflon so that the subsequently poured tooling liner material may contact and cure against the first cured liner without bonding. The subsequently poured liner, after curing, will then be able to be easily separated from the first formed liner and removed from the containment vessel 120. The inner liner may then be separated along the corresponding parting line 152 so that the reference object 150 may be removed 720 from the flexible inner liner. The cavity once occupied by the volume of the reference object 150 is thus bounded by the imparted geometry created by the solidification of the chemical compound about the reference object 150. The inner liner may now be considered the equivalent of the flexible tooling liner described above and utilized as necessary to cast a ceramic core according to the steps previously described. Finally, it may be recognized that during or after formation, the outer and/or inner liner halves 162 may be modified in a plurality of ways familiar to those skilled in the art. For example, the liner(s) may be trimmed to reduce its mass, improve the mutual realignment of the liners, promote heating of the liners, increase flexibility of the liners, and/or other actions advantageous to ceramic core production.

Those skilled in the art will be aware that the current methods employed to yield the geometry definition of the flexible liner tooling topography is dependent on a machined master tool, conventionally cut or otherwise sculpted from a solid block of a raw metal such as aluminium. Such master tooling requires an extraordinary amount of time labor, and cost to produce and has limited flexibility in terms of the ability to implement alterations, repairs, or rework, without considerably impacting a typical budget and labor schedule.

The methods disclosed avoid the necessitation for a costly machined master tool, but instead utilizes a crafted reference object to form the basis of the flexible liner topography. This may be achieved by immersing that reference object in an appropriate containment vessel with a liquid chemical compound capable of solidifying and, upon curing, forming a flexible liner tool.

While embodiments of the present disclosure have been disclosed in exemplary forms, it will be apparent to those skilled in the art that many modifications, additions, and deletions can be made therein without departing from the spirit and scope of the invention and its equivalents, as set forth in the following claims.

What is claimed is:

1. A method for producing a flexible tooling liner for casting a ceramic core, comprising:
   producing a reference object representative of the ceramic core to be cast;
   disposing the reference object into a containment vessel configured to receive a liquid flexible tooling liner material within a cavity defined by the containment vessel and the reference object, wherein the reference object comprises a separation feature, wherein the reference object is configured to separate the cavity into a 1st volume that is located on a 1st side of the separation feature and a 2nd volume that is located on a 2nd side of the separation feature opposite the 1st side, that is sealed from the 1st volume, and that is separated from the 1st volume by a thickness of the separation feature;
   filling the 1st volume and the 2nd volume with the liquid flexible tooling liner material so that both a 1st side and a 2nd side of the reference object are encapsulated by the liquid flexible tooling liner material on the surfaces whose topography is intended to be imparted in the flexible tooling liner formed upon the curing of the liquid flexible tooling liner material;
   allowing the liquid flexible tooling liner material to cure to form a cured flexible tooling liner comprising a 1st flexible mold portion formed by the 1st volume and a 2nd flexible mold portion that is formed by the 2nd volume and that is discrete from the 1 st flexible mold portion; and
   separating the 1st flexible mold portion from the 2nd flexible mold portion and removing the reference object;
   wherein when assembled together the 1st flexible mold portion and the 2nd flexible mold portion are configured to abut each other and to thereby form the ceramic core therebetween in a shape of the reference object without the separation feature.

2. The method as claimed in claim 1, the producing of the reference object accomplished by a process selected from the group consisting of additive manufacturing, molding, and machining.

3. The method as claimed in claim 1, wherein the thickness (t) lies in a range of 0.10 to 0.30 in.

4. The method as claimed in claim 1, wherein the liquid flexible tooling liner material is uncured silicone rubber.

5. The method as claimed in claim 1, wherein the separation feature comprises an alignment feature, for the alignment of the reference object within the containment vessel, the alignment feature selected from the group consisting of an extended tab or stem, protrusion, embossment, and a tongue and groove interface.

6. The method 10 as claimed in claim 1, wherein the separation feature comprises a font and feed channel geometry so that a ceramic slurry may be fed into the flexible tooling liner in order to produce the ceramic core.

7. The method as claimed in claim 1, further comprising modifying the geometry of the reference object by installing an insert having a contoured geometry within a cavity in the reference object, wherein the contoured geometry is a different geometry than the replaced geometry of the reference object.

8. The method as claimed in claim 1, wherein the reference object includes features representative of a gas turbine blade or vane.

9. The method as claimed in claim 1, wherein the separation feature is configured to form alignment features in the 1st flexible mold portion and the 2nd flexible mold portion that align the 1st flexible mold portion and the 2nd flexible mold portion with each other when the 1st flexible mold portion and the 2nd flexible mold portion are assembled together.

10. A method of forming a ceramic core for an investment casting from a flexible tooling liner, comprising:
    producing a reference object representative of the ceramic core to be cast and further comprising a separation feature;
    disposing the reference object into a containment vessel configured to receive a liquid tooling material in a cavity defined by the containment vessel and the reference object, wherein the reference object is configured to separate the cavity into a 1 st volume that is located on a 1st side of the separation feature and a 2nd volume that is located on a 2nd side of the separation feature opposite the 1st side, that is sealed from the 1st volume, and that is separated from the 1st volume by the separation feature;
    filling the 1st volume and the 2nd volume with the liquid tooling material so that both a 1st side and a 2nd side of the reference object sare encapsulated by the liquid tooling material on the surfaces whose topography is intended to be imparted in the flexible tooling liner formed upon the curing of the liquid tooling material;
    allowing the liquid tooling material to cure to form a cured flexible tooling liner comprising a 1st mold portion formed by the 1st volume and a 2nd flexible mold portion that is formed by the 2nd volume and that is discrete from the 1st flexible mold portion;
    separating the 1st flexible mold portion from the 2nd flexible mold portion and removing the reference object;
    preparing the flexible tooling liner to receive a ceramic material;
    casting the ceramic material in the flexible tooling liner to form the ceramic core in a shape of the reference object without the separation feature; and
    removing the cured ceramic core from the flexible tooling liner.

11. The method as claimed in claim 10, wherein the preparing includes aligning and supporting the opposing portions of the flexible tooling liner.

12. A method for producing a contoured flexible tooling liner for casting a ceramic core by controlling a thickness of a flexible tooling liner, comprising:
    producing a reference object representative of the ceramic core to be cast and further comprising a separation feature;
    disposing the reference object into a containment vessel configured to receive a liquid flexible tooling liner material within a cavity defined by the containment vessel and the reference object, wherein the reference object is configured to separate the cavity into a 1st volume that is located on a 1st side of the separation feature and a 2nd volume that is located on a 2nd side of the separation feature opposite the 1st side, that is sealed from the 1st volume, and that is separated from the 1st volume by the separation feature;
    producing a contoured tooling object configured to form an outward facing surface of an inner liner or to form an inward facing surface of an outer liner;
    disposing the contoured tooling object into the containment vessel so that an inner cavity is defined by the reference object and the contoured tooling and an outer cavity is defined by the contoured tooling and the containment vessel, wherein a 1st portion of the inner cavity and a 1st portion of the outer cavity are disposed in the 1st volume, and a 2nd portion of the inner cavity and a 2nd portion of the outer cavity are disposed in the 2nd volume;

filling the inner cavity or the outer cavity with the liquid flexible tooling liner material;

allowing the liquid flexible tooling liner material to cure thereby creating a first liner comprising a first liner 1st portion disposed in the 1st volume and a first liner 2nd mold portion disposed in the 2nd volume;

removing the contoured tooling object from the cavity of the containment vessel;

filling the remaining cavity a remainder of 1st volume and a remainder of the 2nd volume with the liquid flexible tooling liner material;

allowing the liquid flexible tooling liner material to cure within the remainder of the 1st volume and the remainder of the 2nd volume, thereby creating a second liner comprising a second liner $1^{st}$ portion disposed in the remainder of the 1st volume and a second liner $2^{nd}$ portion disposed in the remainder of the 2nd volume;

removing the cured first liner and the cured second liner from the containment vessel; and separating the first liner 1st portion and the second liner 1st portion from the first liner 2nd portion and the second liner $2^{nd}$ portion and removing the reference object, wherein the thickness of the first liner is controlled to be within a thickness range of 0.10 to 0.40 in.

13. The method as claimed in claim 12, wherein the containment vessel includes a shape of a box having flat inner walls.

14. The method as claimed in claim 12, the producing of the reference object accomplished by a process selected from the group consisting of additive manufacturing, molding, and machining.

15. The method as claimed in claim 12, wherein the inner cavity is filled with the liquid flexible tooling liner material and the liquid flexible tooling liner material allowed to cure within the inner cavity prior to filling the remainder of the 1st volume and the remainder of the 2nd volume with the liquid flexible tooling liner material and allowing the liquid flexible tooling liner material to cure within the remainder of the 1st volume and the remainder of the 2nd volume.

16. The method as claimed in claim 15, further comprising preparing an outer surface of the first liner with a coating prior to filling the remainder of the 1st volume and the remainder of the 2nd volume with the liquid flexible tooling liner material in order to prevent a subsequently poured liquid flexible tooling liner of the second liner from a bonding to the cured first liner.

17. The method as claimed in claim 12, wherein the outer cavity is filled with the liquid flexible tooling liner material and allowed to cure within the outer cavity prior to filling the remainder of the 1st volume and the remainder of the 2nd volume with the liquid flexible tooling liner material and allowing the liquid flexible tooling liner material to cure within the remainder of the 1st volume and the remainder of the 2nd volume.

18. The method as claimed in claim 17, further comprising preparing an outer surface of the cured first liner with a coating prior to filling the remainder of the 1st volume and the remainder of the 2nd volume with the liquid flexible tooling liner material in order to prevent a subsequently poured liquid flexible tooling liner of the second liner from a bonding to the cured first liner.

\* \* \* \* \*

UNITED STATES PATENT AND TRADEMARK OFFICE
CERTIFICATE OF CORRECTION

PATENT NO. : 12,330,210 B2
APPLICATION NO. : 17/772873
DATED : June 17, 2025
INVENTOR(S) : Travis John Vitello et al.

Page 1 of 1

It is certified that error appears in the above-identified patent and that said Letters Patent is hereby corrected as shown below:

In the Claims

Claim 10, Column 10, Line 23, remove [reference object sare encapsulated] and insert --reference object are encapsulated--;

Claim 12, Column 11, Line 14, after "filling" remove [the remaining cavity].

Signed and Sealed this
Twenty-second Day of July, 2025

Coke Morgan Stewart
*Acting Director of the United States Patent and Trademark Office*